United States Patent
Roth

[11] 3,988,266
[45] Oct. 26, 1976

[54] INTUMESCENT COMPOSITION

[75] Inventor: Shirley H. Roth, Highland Park, N.J.

[73] Assignee: Cities Service Company, Tulsa, Okla.

[22] Filed: Mar. 8, 1976

[21] Appl. No.: 664,739

[52] U.S. Cl. .................. 260/2.5 FP; 106/15 FP; 252/4; 252/5; 260/17.3 R; 260/33.8 R; 260/DIG. 24; 428/460; 428/524; 428/921; 260/2.5 F
[51] Int. Cl.² .................. C08G 12/08; C08J 9/02
[58] Field of Search...... 260/2.5 F, 2.5 FP, DIG. 24; 252/4, 5

[56] References Cited
UNITED STATES PATENTS

| | | | |
|---|---|---|---|
| 3,912,845 | 10/1975 | Roth | 260/72.5 |
| 3,922,251 | 11/1975 | Roth | 260/72.5 |

Primary Examiner—Morton Foelak
Attorney, Agent, or Firm—Patricia J. Hogan

[57] ABSTRACT

A water-insoluble amine-aldehyde copolymer intumescent agent having a number average molecular weight of about 350-2000 and consisting essentially of repeating units corresponding to the formula:

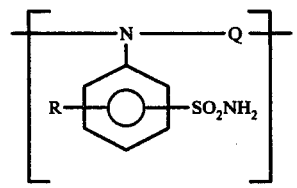

wherein Q is the aldehyde residue and R is hydrogen, alkyl, haloalkyl, alkoxy, haloalkoxy, halo, nitro, acetamido, or sulfonamido is mixed with about 10–50% by weight of a synergist corresponding to the formula:

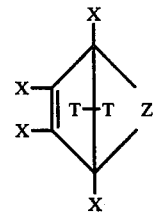

wherein X is chloro or bromo, T is halo, hydrogen, or a hydrocarbyl or hydrocarbyloxy group, and Z is a monocyclic divalent saturated polybromocycloalkylene group containing 5–16 carbon atoms and 2–6 bromine atoms: said valences being on adjacent carbon atoms; to increase the foam volume obtainable from the intumescent agent. The compositions comprising the intumescent agent and synergist may be applied to substrates by conventional techniques.

13 Claims, No Drawings

INTUMESCENT COMPOSITION

BACKGROUND OF THE INVENTION

1. Field of the Invention

This invention relates to intumescent compositions and more particularly relates to such compositions containing a sulfanilamide-formaldehyde-type intumescent agent and a synergist.

2. Description of the Prior Art

As taught in U.S. Pat. Nos. 3,912,845 and 3,922,251, sulfanilamide-formaldehyde-type copolymers, especially those of 3,922,251, are useful as intumescent agents. When so used and exposed to heat and fire, they produce a good volume of foam to protect the substrates to which they have been applied.

SUMMARY OF THE INVENTION

An object of the invention is to increase still further the effectiveness of sulfanilamide-formaldehyde-type intumescent agents.

Another object is to provide intumescent compositions comprising a sulfanilamide-formaldehyde-type copolymer and a synergist.

These and other objects are attained by mixing (A) a water-insoluble amine-aldehyde copolymer intumescent agent having a number average molecular weight of about 350–2000 and consisting essentially of repeating units corresponding to the formula:

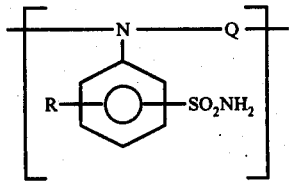

wherein Q is the aldehyde residue and R is hydrogen, alkyl, haloalkyl, alkoxy, haloalkoxy, halo, nitro, acetamido, or sulfonamido with about 10–50%, based on the weight of the intumescent agent, of (B) a synergist corresponding to the formula:

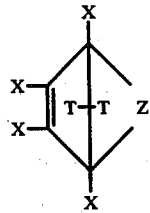

wherein X is chloro or bromo, T is halo, hydrogen, or a hydrocarbyl or hydrocarbyloxy group and Z is a monocyclic divalent saturated polybromocycloalkylene group containing 5–16 carbon atoms and 2–6 bromine atoms; said valences being on adjacent carbon atoms.

DESCRIPTION OF THE PREFERRED EMBODIMENTS

The amine-aldehyde intumescent agents of the invention are the copolymers of U.S. Pat. No. 3,922,251, the teachings of which are incorporated herein by reference. As taught in that patent, they are copolymers wherein the residues of a sulfanilamide-type compound, i.e., a substituted or unsubstituted o-, m-, or p-aminobenzenesulfonamide, are bonded to aldehyde residues through the nitrogen of the amino group.

Amines suitable for the preparation of the copolymers include, e.g., sulfanilamide, o-amino-benzenesulfonamide, m-aminobenzenesulfonamide, 4-amino-2-ethylbenzenesulfonamide, 2-amino-3-chloromethylbenzenesulfonamide, 3-amino-2-butoxybenzenesulfonamide, 4-amino-3-bromomethoxybenzenesulfonamide, 4-amino-2-chlorobenzenesulfonamide, 2-amino-4-bromobenzenesulfonamide, 4-amino-2-nitrobenzenesulfonamide, 4-amino-2-acetamidobenzenesulfonamide, 4-amino-1,3-disulfonamidobenzene, etc., and mixtures thereof.

Suitable aldehydes may be saturated or unsaturated and include, e.g., formaldehyde, acetaldehyde, propionaldehyde, butyraldehyde, pentaldehyde, hexaldehyde, octaldehyde, benzaldehyde, furfural, acrolein, methacrolein, crotonaldehyde, cinamaldehyde, etc., and mixtures thereof.

The preferred intumescent agents of the invention are the sulfanilamide-formaldehyde copolymers, but the other copolymers of U.S. Pat. No. 3,922,251 are also utilizable.

The synergist of the invention may be any compound corresponding to the formula designated above for the synergist. Such compounds are already known and may be prepared, e.g., by reacting a polyhalocyclopentadiene with a suitable multi-unsaturated cycloaliphatic hydrocarbon to form a 1:1 Diels-Alder adduct, and then adding bromine to the residual unsaturation and, if desired, introducing additional bromine by substitution bromination.

Polyhalocyclopentadienes suitable for use in preparing the synergists of the invention include hexachlorocyclopentadiene, hexabromocyclopentadiene, 5,5-dimethoxytetrachlorocyclopentadiene, 5,5-diethoxytetrachlorocyclopentadiene, 5,5-dihydrotetrachlorocyclopentadiene, 5,5-difluorotetrachlorocyclopentadiene, 5,5-dibromotetrachlorocyclopentadiene, etc.

Multi-unsaturated cycloaliphatic hydrocarbons suitable for use in preparing the synergists of the invention include cyclopentadiene, cyclohexadiene, cyclooctadiene-1,3, cyclooctadiene-1,5, cyclodecadiene-1,5, cycloheptatriene-1,3,6, cyclododecatriene-1,5,9, cyclooctatetraene, cyclohexadecatetraene-1,5,9,13, etc.

The preferred synergists of the invention are those in which X and T of the formula are chloro. The most preferred synergists are the compounds which have the structures of dibrominated adducts of hexachlorocyclopentadiene with cyclopentadiene or cyclooctadiene, i.e., compounds corresponding to the formulas:

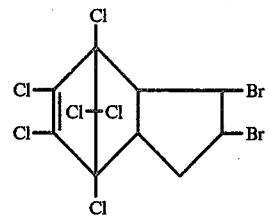

and

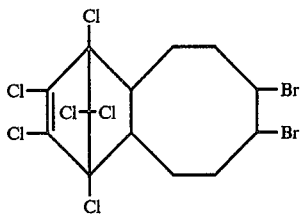

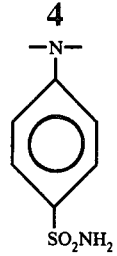

The synergist is mixed with the intumescent agent in any suitable manner, e.g., by grinding the ingredients together, to provide an admixture containing about 10–50% of synergist, based on the weight of the intumescent agent. The optimum concentration of a particular synergist varies, of course, with its cost relative to the cost of the intumescent agent, as well as with its degree of effectiveness. When the synergist is the cyclooctadiene adduct mentioned above, its concentration is preferably about 10–35%, more preferably about 15–30%, and most preferably about 20% by weight. When the synergist is the cyclopentadiene adduct mentioned above, its concentration is preferably about 10–50%, more preferably about 15–50%, and most preferably about 20% by weight.

For use in protecting a substrate from heat and fire, the intumescent agent/synergist compositions of the invention may be applied in any suitable manner, e.g., electrodeposition, spraying of powdered intumescent agent/synergist composition onto an adhesive substrate, etc. However, it is usually preferred to compound the intumescent agent and synergist with a binder, e.g., nitrocellulose, and optionally also with one or more of the other ingredients conventionally used in intumescent compositions, e.g., stabilizers, dispersing agents, pigments, driers, biocides, antifoamers, thickeners, protective colloids, fillers, blowing agents, etc.; disperse the composition in a suitable liquid medium, e.g., water or a solvent or solvent mixture; and apply the coating composition thus formed to the substrate to be protected. As is the case with conventional intumescent coating compositions, it is frequently convenient to apply these coating compositions in the form of a paint having a solids content of about 10–70% by weight and an intumescent agent-synergist/binder weight ratio of about 0.075–14/1 to deposit a coating having a dry thickness of about 0.001–0.75 inch (i.e., about 0.0254–19.05 mm.).

The intumescent agent/synergist compositions of the invention are efficient, have low moisture sensitivity, and intumesce to form foams having even better volume than the foams produced from the intumescent agent alone, while maintaining the good cell structure and adherence to substrates, such as wood, metal, and plastics, that is characteristic of the foams produced from the intumescent agent alone. They are also useful as flame retardants in normally flammable compositions.

The following examples are given to illustrate the invention and are not intended as a limitation thereof. Unless otherwise specified, quantities mentioned are quantities by weight, and the sulfanilamide-formaldehyde copolymer employed as an intumescent agent is a copolymer which has been prepared in accordance with the teachings of U.S. Pat. No. 3,922,251 so that the sulfanilamide units correspond to the formula:

EXAMPLE I - CONTROL

Place one gram of sulfanilamide-formaldehyde copolymer in an aluminum pan having a diameter of 57 mm. and a height of 16 mm. Flame the sample with a propane torch. The copolymer intumesces to form a foam volume of 1-1/3 pans.

EXAMPLE II - CONTROL

Repeat Example I except for replacing the sulfanilamideformaldehyde copolymer with a compound corresponding to the formula:

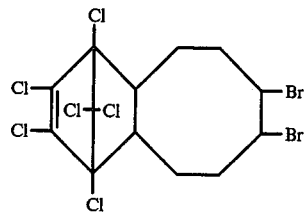

No intumescence is observed.

EXAMPLE III

Repeat Example I except for mixing, respectively, 0.05, 0.1, 0.2, 0.3, and 1.0 gram of the compound of Example II with one gram of the sulfanilamide-formaldehyde copolymer of Example I before flaming. The compositions intumesce to form foam volumes of 1-½, 2, 4, 2¼, and ⅔ pans, respectively. In each case, the foam has excellent char structure.

EXAMPLE IV - CONTROL

Repeat Example I except for replacing the sulfanilamideformaldehyde copolymer with a compound corresponding to the formula:

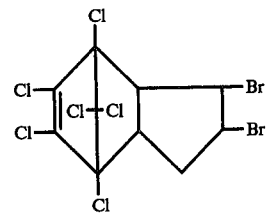

No intumescence is observed.

EXAMPLE V

Repeat Example I except for mixing, respectively, 0.1, 0.2, 0.4, 0.5 and 1.0 gram of the compound of Example IV with one gram of the sulfanilamide-formaldehyde copolymer of Example I before flaming. The compositions intumesce to form foam volumes of 1-⅔, 3, 2, 2, and about 1, respectively. In each case, the foam has excellent char structure.

The preceding examples show that the synergists of the invention increase the foam volume when used at the appropriate concentrations, even though they may actually decrease the foam volume when used at higher or lower concentrations. similar results are observed when the sulfanilamide-formaldehyde copolymer and/or the above-specified synergists of the invention are replaced by materials taught to be their equivalents in the specification. The following example demonstrates the inability of other halogenated compounds to be substituted for the synergists of the invention.

EXAMPLE VI - CONTROL

Repeat Example I except for mixing, respectively, 0.1, 0.2, 0.3, and 0.5 gram of decabromodiphenyl oxide with one gram of the sulfanilamide-formaldehyde copolymer of Example I before flaming. The compositions intumesce to form foam volumes of not more than ¼ pan in each case.

It is obvious that many variations may be made in the products and processes set forth above without departing from the spirit and scope of this invention.

What is claimed is:

1. An intumescent composition comprising (A) a water-insoluble amine-aldehyde copolymer intumescent agent having a number average molecular weight of about 350–2000 and consisting essentially of repeating units corresponding to the formula:

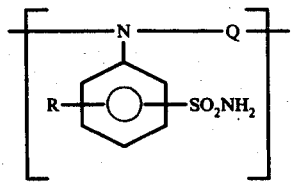

wherein Q is the aldehyde residue and R is hydrogen, alkyl, haloalkyl, alkoxy, haloalkoxy, halo, nitro, acetamido, or sulfonamido and (B) about 10–50%, based on the weight of the intumescent agent, of a synergist corresponding to the formula:

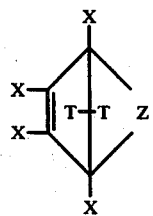

wherein X is chloro or bromo, T is halo, hydrogen, or a hydrocarbyl or hydrocarbyloxy group, and Z is a monocyclic divalent saturated polybromocycloalkylene group containing 5–16 carbon atoms and 2–6 bromine atoms; said valences being on adjacent carbon atoms.

2. The composition of claim 1 wherein R is hydrogen.

3. The composition of claim 2 wherein the amine portion of the repeating unit corresponds to the formula:

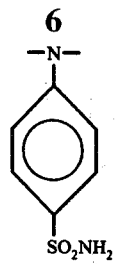

4. The composition of claim 1 wherein Q is the residue of an alkanal containing 1–5 carbon atoms.

5. The composition of claim 4 wherein the alkanal is formaldehyde.

6. The composition of claim 1 wherein the repeating units correspond to the formula:

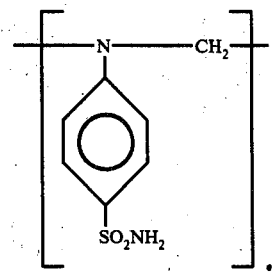

7. The composition of claim 1 wherein X and T are chloro.

8. The composition of claim 7 wherein the synergist corresponds to the formula:

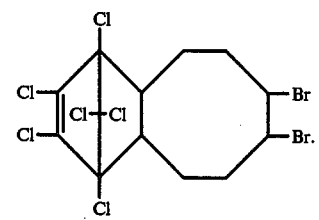

9. The composition of claim 8 wherein the concentration of synergist is about 10–35%, based on the weight of the intumescent agent.

10. The composition of claim 7 wherein the synergist corresponds to the formula:

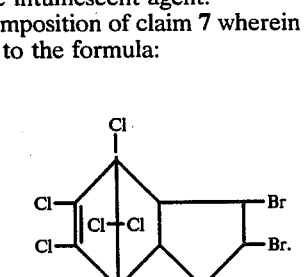

11. An intumescent composition comprising (A) a water-insoluble sulfanilamide-formaldehyde copolymer intumescent agent having a number average molecular weight of about 350–2000 and consisting essentially of repeating units corresponding to the formula:

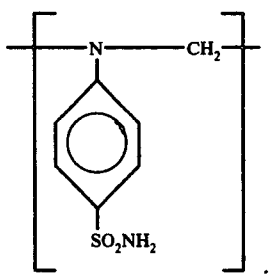

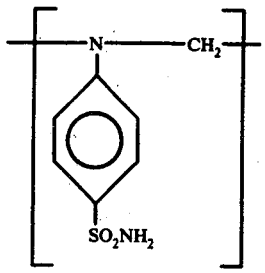

and (B) about 15–30%, based on the weight of the intumescent agent, of a synergist corresponding to the formula:

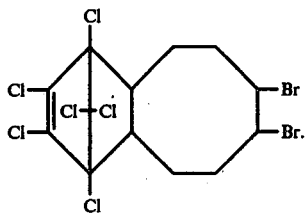

12. An intumescent composition comprising (A) a water-insoluble sulfanilamide-formaldehyde copolymer intumescent agent having a number average molecular weight of about 350–2000 and consisting essentially of repeating units corresponding to the formula:

and (B) about 15–50%, based on the weight of the intumescent agent, of a synergist corresponding to the formula:

13. An article which comprises a substrate coated with the intumescent composition of claim 1.

* * * * *